S. S. CLARK.
Straw Cutter.
No. 26,835.
Patented Jan'y 17, 1860.
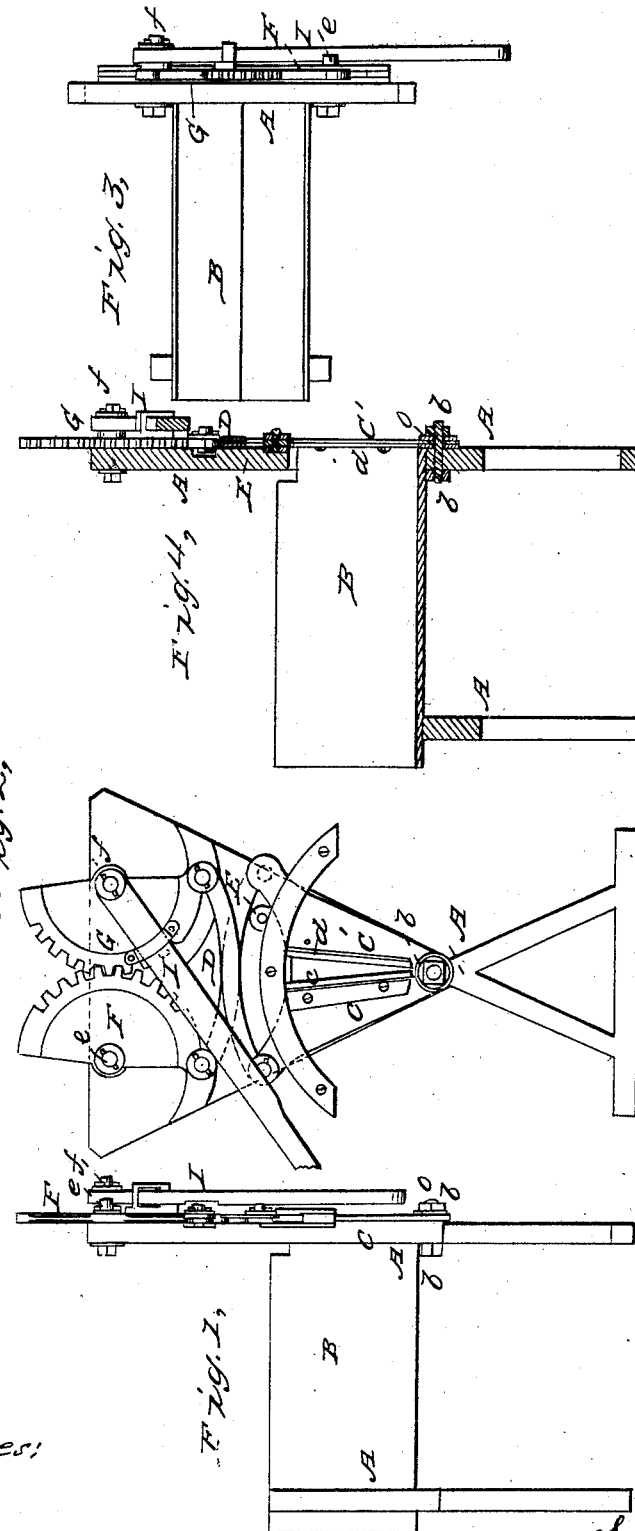
Witnesses:
F. P. Hale Jr.
Arthur Neill
Inventor:
Sylvanus S Clark

UNITED STATES PATENT OFFICE.

SYLVANUS S. CLARK, OF MANCHESTER, NEW HAMPSHIRE.

HAY OR STRAW CUTTER.

Specification of Letters Patent No. 26,835, dated January 17, 1860.

*To all whom it may concern:*

Be it known that I, SYLVANUS S. CLARK, of Manchester, in the county of Hillsboro and State of New Hampshire, have invented a new and useful or Improved Hay or Straw Cutter; and I do hereby declare that the same is fully described and represented in the following specification and the accompanying drawings, of which—

Figure 1, represents a side elevation; Fig. 2, a front end elevation; Fig. 3, a top view, and Fig. 4, a longitudinal section of my improved machine.

The nature of my invention consists in a peculiar combination and arrangement of two crossed connecting rods and two sectoral levers and a brake lever the whole being applied to the supporting frame and the knives or shear cutters in manner as hereinafter set forth.

In the drawings, A, denotes the frame of the machine; B, is a hopper or receiver extending longitudinally thereof. The said hopper has both of its ends open, and is formed triangular in cross section as seen in the drawings.

C, C', are the shear or cutter bars which are jointed at their lower ends, and confined to the frame A, by means of a bolt or screw rod *o*, passing through the said bars and frame. The said bolt *o*, serves as a fulcrum for the bars to turn upon, and has a nut, *b*, upon one or both of its ends as seen in the drawings. The said cutter bars C, C', have knives or cutters, *c*, *d*, respectively attached to their inner edges, the same being so applied as to be adjustable with respect to each other; and besides the said knives are made to operate together like the blades of a pair of shears and while in operation are moved laterally across the discharging end of the hopper and are caused to approach toward and recede from one another alternately; and furthermore the said cutter bars are respectively jointed at their upper ends to curved connecting rods, D, E, the other ends of the said connecting rods being in turn jointed to the lower ends of two sectoral levers F, G, formed in side view as seen in Fig. 1. The said levers, F, and G, are respectively connected to the front side of the frame A, by screw bolts or pins, *e*, *f*, passing through the said levers and into or through the main frame. These levers are sectors of circles, each having an arc of cogs on its periphery; the cogs of one engage with those of the other in order that the movements of one may be simultaneous with that of the other and be actuated by it, the latter having a bar or brake I, extending from it as shown in the drawings. By laying hold of the said bar and moving it upward and downward, such a movement will be created in the sectoral levers as will cause the two knives to approach toward and recede from one another, and to perform the operation of cutting straw or other substance when made to extend between them and from the hopper.

A machine so constructed is not only very simple, in construction, but efficient in operation. The peculiar arrangement of the knives with respect to the mouth of the hopper enables the weight of the mass of straw or material while being cut to operate in such manner as to facilitate the action of the knives upon it, as the stuff while being cut is borne upward or supported on the cutting edges of the two knives.

By arranging the sectoral arms, brakes, and connecting bars above the knives, C, C' and the mouth of the hopper as represented we gain the advantage of bringing both the hopper and the brake more convenient for the operative, than when the brake and operating machinery are applied below the hopper and the knives.

I claim—

1. The combination and arrangement of the crossed connecting rods D, E, the brake I, and the sectoral levers F, G, applied to the supporting frame and the shear cutters or mechanism substantially the same.

2. I also claim arranging the sectoral arms, brake, and connecting bars above the knives, C, C', and the mouth of the hopper as represented.

SYLVANUS S. CLARK.

Witnesses:
R. N. EDDY,
F. P. HALE, Jr.